US012643568B2

(12) United States Patent
Kim et al.

(10) Patent No.: US 12,643,568 B2
(45) Date of Patent: Jun. 2, 2026

(54) METHOD FOR LEARNING TO DRIVE GROWING AUTONOMOUS VEHICLES IN REAL TIME BASED ON DRIVER INTERACTION

(71) Applicant: ELECTRONICS AND TELECOMMUNICATIONS RESEARCH INSTITUTE, Daejeon (KR)

(72) Inventors: Jinwoo Kim, Daejeon (KR); Ki Tae Kim, Daejeon (KR); Myungwook Park, Daejeon (KR); Kyoung Hwan An, Daejeon (KR); MyungIn Ji, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/944,856

(22) Filed: Nov. 12, 2024

(65) Prior Publication Data

US 2025/0187627 A1 Jun. 12, 2025

(30) Foreign Application Priority Data

Dec. 7, 2023 (KR) ........................ 10-2023-0176638

(51) Int. Cl.
*B60W 40/08* (2012.01)
*B60W 50/02* (2012.01)
(Continued)

(52) U.S. Cl.
CPC .......... *B60W 60/001* (2020.02); *B60W 40/08* (2013.01); *B60W 50/0205* (2013.01);
(Continued)

(58) Field of Classification Search
CPC .............. B60W 60/001; B60W 40/08; B60W 50/0205; B60W 2040/089;
(Continued)

(56) References Cited

U.S. PATENT DOCUMENTS 9,633,564 B2 * 4/2017 Ferguson ............... G01C 21/32
10,435,035 B2 * 10/2019 Wiegand ............... B60K 35/22
(Continued)

FOREIGN PATENT DOCUMENTS

KR 10-2020-0133444 A 11/2020
KR 10-2022-0070466 A 5/2022
(Continued)

OTHER PUBLICATIONS

Incorporating Voice Instructions in Model-Based Reinforcement Learning for Self-Driving Cars (Year: 2021).*

*Primary Examiner* — Masud Ahmed
(74) *Attorney, Agent, or Firm* — LRK PATENT LAW FIRM

(57) ABSTRACT

Disclosed herein is a method for learning to drive growing autonomous vehicles in real time based on driver interaction, which includes (a) an autonomous vehicle performing autonomous driving learning based on driving guidance information generated using information received from a driving expert, (b) the autonomous vehicle performing external driving environment recognition matching on a result of recognition of a recognition system and a result of recognition of the driving expert, and (c) the autonomous vehicle performing reviewing and learning after driving training to improve a level of autonomous driving.

4 Claims, 4 Drawing Sheets

(51) Int. Cl.

| | | |
|---|---|---|
| *B60W 60/00* | (2020.01) | |
| *G10L 15/26* | (2006.01) | |
| *B60W 50/00* | (2006.01) | |

(52) U.S. Cl.
CPC ........ *G10L 15/26* (2013.01); *B60W 2040/089* (2013.01); *B60W 2050/0083* (2013.01); *B60W 2540/21* (2020.02)

(58) Field of Classification Search
CPC ..... B60W 2050/0083; B60W 2540/21; B60W 2050/0088; B60W 50/085; B60W 50/14; B60W 50/08; B60W 40/09; B60W 60/00; G10L 15/26; G10L 15/08
See application file for complete search history.

(56) References Cited

U.S. PATENT DOCUMENTS

| | | | | |
|---|---|---|---|---|
| 11,420,653 | B2 * | 8/2022 | Jeon | ................ B60W 60/00274 |
| 11,654,939 | B2 * | 5/2023 | Jeon | ................. B60W 60/0053 |
| | | | | 701/36 |
| 2018/0101172 | A1 | 4/2018 | Min et al. | |
| 2019/0016339 | A1 * | 1/2019 | Ishioka | ............ B60W 30/0956 |
| 2019/0101924 | A1 * | 4/2019 | Styler | .................... G06V 20/56 |
| 2019/0143992 | A1 | 5/2019 | Sohn et al. | |
| 2020/0369294 | A1 * | 11/2020 | Jeon | ................ B60W 60/00276 |
| 2021/0188289 | A1 * | 6/2021 | Oba | ......................... G08G 1/16 |

FOREIGN PATENT DOCUMENTS

| | | | |
|---|---|---|---|
| KR | 10-2023-0045696 | A | 4/2023 |
| KR | 10-2023-0063807 | A | 5/2023 |
| KR | 10-2023-0099518 | A | 7/2023 |
| KR | 10-2023-0134161 | A | 9/2023 |

* cited by examiner

FIG. 1

LEARN AUTONOMOUS DRIVING BASED ON
DRIVING GUIDANCE INFORMATION ⌐ S310

PERFORM MATCHING ON EXTERNAL
DRIVING ENVIRONMENT RECOGNITION ⌐ S320

IMPROVE LEVEL THROUGH
REVIEWING AND LEARNING ⌐ S330

METHOD FOR LEARNING TO DRIVE GROWING AUTONOMOUS VEHICLES IN REAL TIME BASED ON DRIVER INTERACTION

CROSS-REFERENCE TO RELATED APPLICATION(S)

This application claims priority to and the benefit under 35 USC § 119 of Korean Patent Application No. 10-2023-0176638 filed on Dec. 7, 2023, in the Korean Intellectual Property Office, the entire disclosures of which is incorporated herein by reference for all purposes.

BACKGROUND

1. Technical Field

The present disclosure relates to a method for learning to drive growing autonomous vehicles in real time based on driver interaction.

2. Description of Related Art

Autonomous driving technology according to the prior art continues to improve the intelligence of vehicles based on artificial intelligence technology in order to adapt to complex and diverse road environments and perform autonomous driving.

The intelligence of autonomous vehicles has mostly focused on technology that recognizes driving environments, such as cameras, lidar, and radar, and autonomous driving has been performed through determination and control pursuant to the recognition technology based on artificial intelligence.

However, the scope of artificial intelligence technology is currently expanding that integrates determination and control with the field of recognition and determination. Moreover, research is being conducted to improve the intelligence of autonomous vehicles by integrating or combining imitation learning and reinforcement learning.

SUMMARY

The present disclosure has been proposed with the above-mentioned matters in mind, and an object thereof is to provide a learning method capable of continuously improving a level of autonomous driving by allowing an autonomous vehicle to perform learning in real time under guidance of a driving expert, to perform matching on external driving environment recognition of a recognition system and a driving expert, and to perform reviewing and learning on its own after completion of driving training.

In accordance with an aspect of the present disclosure, there is provided a method for learning to drive growing autonomous vehicles in real time based on driver interaction, which includes (a) an autonomous vehicle performing autonomous driving learning based on driving guidance information generated using information received from a driving expert, (b) the autonomous vehicle performing external driving environment recognition matching on a result of recognition of a recognition system and a result of recognition of the driving expert, and (c) the autonomous vehicle performing reviewing and learning after driving training to improve a level of autonomous driving.

The (a) an autonomous vehicle performing autonomous driving learning may perform the autonomous driving learning using utterance information of the driving expert.

The utterance information may include an instruction for movement of the autonomous vehicle, a confirmation of surrounding recognition situations, a penalty related to intervention in case of issues that occur during driving, a reward for good work, and an additional explanation of situations to watch out for.

The (a) an autonomous vehicle performing autonomous driving learning may classify a result of converting the utterance information into text, perform matching with a list of predefined driving instruction data, and generate the driving guidance information.

The (a) an autonomous vehicle performing autonomous driving learning may record information on situations where control of driving is taken through intervention of the driving expert in different driving situations.

The (b) the autonomous vehicle performing external driving environment recognition matching may perform the matching using the result of recognition of the recognition system that recognizes driving environments in real time during the driving training and the result of recognition of the driving expert, which is a record stored for a point in time that the driving expert looks at external driving environments.

The (c) the autonomous vehicle performing reviewing and learning may receive information of determination on whether there is an abnormality from the driving expert in relation to driving status information of the autonomous vehicle and information on training instructions, receive a result of reconfirmation of commands by the driving expert, and perform the reviewing and the learning using the information of determination and the result of reconfirmation of commands.

In accordance with another aspect of the present disclosure, there is provided a system for learning to drive growing autonomous vehicles in real time based on driver interaction, which includes an input interface device configured to receive utterance information of a driving expert through a user interface, a memory configured to store a program for performing driving learning of an autonomous vehicle using the utterance information, and a processor configured to execute the program. The processor performs the driving learning based on driving guidance information generated using the utterance information, performs matching on a result of recognition of a recognition system and a result of recognition of the driving expert, and performs reviewing and learning after driving training to improve a level of autonomous driving.

The input interface device may receive the utterance information that includes an instruction for movement of the autonomous vehicle, a confirmation of surrounding recognition situations, a penalty related to intervention in case of issues that occur during driving, a reward for good work, and an additional explanation of situations to watch out for.

The processor may match a result of converting the utterance information into text with a list of predefined driving instruction data, and generate the driving guidance information.

The processor may record information on situations where control of driving is taken through intervention of the driving expert in different driving situations.

The processor may perform the matching using the result of recognition of the recognition system that recognizes driving environments in real time during the driving training and the result of recognition of the driving expert, which is a record stored for a point in time that the driving expert looks at external driving environments.

The processor may receive information of determination on whether there is an abnormality from the driving expert in relation to driving status information of the autonomous vehicle and information on training instructions, receive a result of reconfirmation of commands by the driving expert, and perform the reviewing and the learning using the information of determination and the result of reconfirmation of commands.

BRIEF DESCRIPTION OF THE DRAWINGS

FIG. 1 illustrates a method for learning growing autonomous driving training based on interaction between a driver and a vehicle according to an embodiment of the present disclosure.

DETAILED DESCRIPTION

Figure 2:
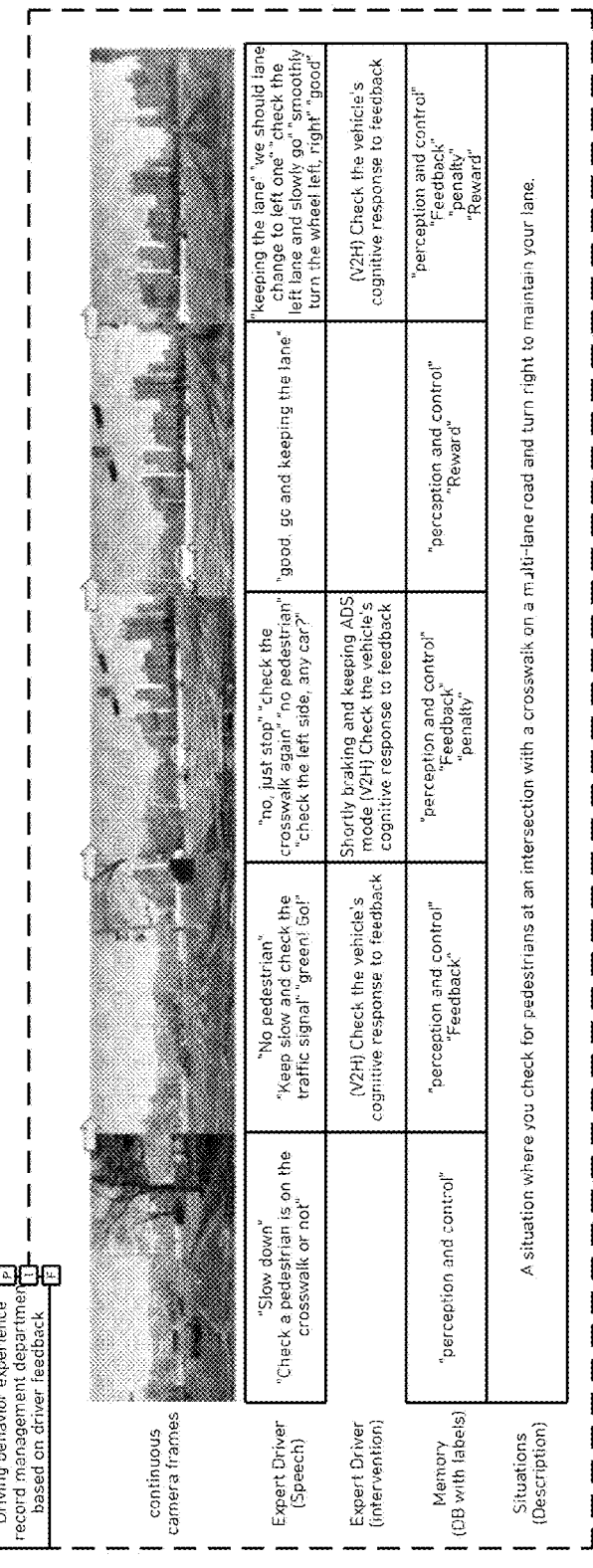
FIG. 2 illustrates a method for managing driving behavior experience data recording based on driving expert feedback according to the embodiment of the present disclosure.

The above and other objects, advantages, and features of the present disclosure and methods of achieving them will become apparent with reference to the embodiments described below in detail in conjunction with the accompanying drawings.

The present disclosure may, however, be embodied in different forms and should not be construed as limited to the embodiments set forth herein. The following embodiments are provided solely to facilitate the purpose, configuration and effect of the disclosure to those of ordinary skill in the art to which the present disclosure pertains, and the scope of the present disclosure is defined by the appended claims.

Meanwhile, the terms used herein are for the purpose of describing the embodiments and are not intended to limit the disclosure. As used herein, the singular forms "a", "an" and "the" are intended to include the plural forms as well, unless context clearly indicates otherwise. It will be understood that the terms "comprises"/"includes" and/or "comprising"/ "including" when used in the specification, specify the presence of stated components, steps, motions, and/or elements, but do not preclude the presence or addition of one or more other components, steps, motions, and/or elements.

An embodiment of the present disclosure describes an autonomous driving artificial intelligence technology that provides various experiences of expert drivers through user interfaces for vehicles with basic knowledge and acquires data necessary for learning.

According to the prior art, in order to learn autonomous driving intelligence, it has been necessary to perform recognition of surrounding moving objects, static objects, road surfaces, and positions, and to classify its result into recognition/determination/control from a computing perspective through three-dimensional or bird's-eye view (BEV) or generate a driving path to perform control and driving.

On the other hand, according to the embodiment of the present disclosure, it is possible to apply an artificial intelligence model that is able to be guided in stages from low speed by driving experts and developed through communication therefor, data extraction, and UX for mutual understanding and communication for systematic driving techniques based on artificial intelligence.

The embodiment of the present disclosure is directed to, when driving a vehicle that is not equipped with driving intelligence for autonomous driving from a perspective of an expert driver, a method for performing autonomous driving from a low level through guidance and developing intelligence through real-time (on-line) and non-real-time (off-line) learning.

Communication Interface between Autonomous Vehicle and Guidance Expert

According to the embodiment of the present disclosure, the vehicle includes a function for controlling a driving expert to perform basic operations such as driving, a UI and interactive control level recognition function for allowing communication with the driving expert, and a basic function for giving priority to the operation of the vehicle and receiving guidance through speech and motion in different situations.

For example, with Priority 1, the operation of left and right control of the steering wheel is guided by instructions such as "slowly to the left, little more, straighten the steering wheel, quickly, turn to the right once, and release the steering wheel".

The operation of control of the vehicle speed while operating and maintaining the steering wheel is guided by instructions such as "speed up a little, little more, speed up to 50, slow down, and slow down more".

If there is a vehicle on the path ahead of an ego-vehicle, the operation of control of the ego-vehicle is guided by instructions such as "slow down because there is a vehicle ahead, slow down in advance, and slow down even earlier when the speed is high".

The operation of control of the vehicle steering wheel and speed in environments with slopes or curves is guided by instructions such as "slow down when the curve starts, slow down more, and accelerate while keeping the steering wheel within the lane about halfway around the curve".

Real-Time Response System Based on Driving Expert Feedback

Humans have a very short time to listen to and perceive human speech, but when considering the time to listen, understand, and respond, there is not much difference between training at an actual driver's license test center and driving under commands via speech or assisted driving functions in an autonomous driving system.

According to the embodiment of the present disclosure, basic driving functions are learned by having a driving expert ride in a vehicle with a driver seat and performing imitation through language and situational explanations of the operation of the steering wheel and pedals.

For example, the autonomous vehicle performs learning through real-time feedback on basic driving functions at low speed, and learns a function for "setting the speed to the maximum level 10 and starting by slightly turning the steering wheel left and right before driving along the road" while setting the maximum speed in stages.

Through the pre-recognition function of lanes, crosswalks, and surrounding objects, and the verification function of whether the target is the same as the object mentioned by the driving expert, the autonomous vehicle learns a function for "slowing down in advance because there is a vehicle ahead, slowing down further, stopping with a gap equal to the length of the ego-vehicle, looking left and right, turning the steering wheel to the left once, turning the steering wheel in an opposite direction again when the vehicle starts, and slowing down more".

In relation to the autonomous driving system that responds under the guidance of the driving expert, the messages, situational information, and points in time for feedback are stored as continuous expression of time.

Interaction UX Between Driving Expert and Autonomous Vehicle

According to the embodiment of the present disclosure, when the above-mentioned basic driving training is completed, learning is performed so that the driving intelligence of the vehicle responds according to the speed by increasing the driving speed in stages. The learning for basic driving techniques for various driving courses is completed by increasing speed in stages from low speed.

When driving at high speed, a UX function is provided to predict the driving environment of the actual vehicle and to check whether the driving is made in response to the intention of the driving expert (speaker) by the recognition system, considering the difference (gap) between the time of guidance via speech and the time the command is recognized by the vehicle.

According to the embodiment of the present disclosure, the driving expert learns a driving technique and the vehicle performs pre-learning by comparing the step-by-step driving technique learned at low speed with the technique of the driving expert.

When increasing the speed in stages, the driving expert provides feedback and information on rewards and penalties in real time, and the vehicle performs recognition and response to the guidance of the driving expert in real time.

After the driving is over, the vehicle uses input data about information, guidance, surrounding environment, and vehicle location obtained from the driving expert, performs learning for driving intelligence based on the rewards and penalties, and performs updates therefor.

According to the embodiment of the present disclosure, the autonomous vehicle also acquires driving intelligence through devices, interfaces, systems, and data extraction functions capable of performing learning, just as a person receives driving training for the first time, as described above.

According to the embodiment of the present disclosure, real-time training is provided for vehicles equipped with autonomous driving functions to drive on their own, rather than for operators of autonomous vehicles, and it applies information on feedback during or after driving to develop driving intelligence.

Figure 1:
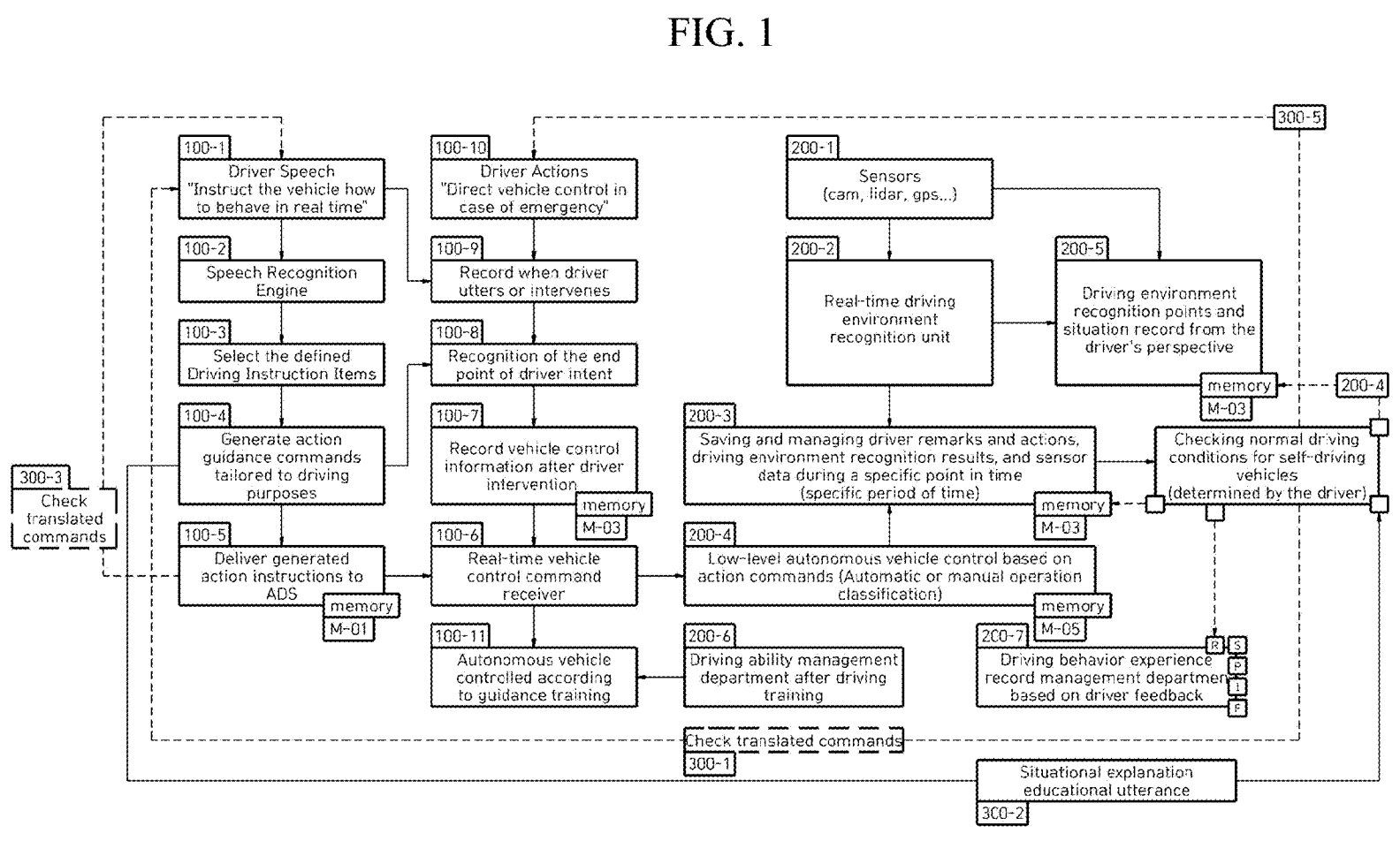

According to the embodiment of the present disclosure, it stores/manages information about instructions for movement of the autonomous vehicle uttered by the driver's speech (instructions, illustrated as "I" in FIG. 1), confirmation and status of surrounding recognition situations (status, illustrated as "S" in FIG. 1), intervention in case of issues or departure during driving (intervention and Penalty, illustrated as "P" in FIG. 1), rewards for good work (reward, illustrated as "R" in FIG. 1), and additional explanations of situations to watch out for or remember (feedbacks, illustrated as "F" in FIG. 1), performs learning based on the stored/managed information (information stored and managed in step 200-7), and improves driving intelligence for learning situations.

FIG. 1 illustrates a method for learning growing autonomous driving training based on interaction between a driver and a vehicle according to an embodiment of the present disclosure.

In step 100-1, a driving expert makes utterances during autonomous vehicle driving training, and the utterances include information about instructions, rewards, feedback, status, and interventions.

In step 100-2, a speech recognition engine converts the utterance information into text and transmits its result.

In step 100-3, the transmitted utterance content is classified and matched with a predefined driving instruction data list in different situations.

In step 100-4, driving guidance information (action guide) is generated to suit the situation and purpose of driving based on matching with the change from the driving expert's speech to the text.

In step 100-5, the driving guidance information is transmitted to the autonomous vehicle to induce action, and the instructed content is stored in a memory M-01.

In step 100-6, speed, steering angle, and longitudinal control are immediately performed based on the driving guidance information transmitted in step 100-5. In this case, the driving guidance information transmitted in step 100-5 also includes an indication relative to the vehicle's speed, so it must respond relatively according to the real-time utterance of the driving expert as well as numerically in relation to sensitive or immediate response.

In step 100-10, in addition to recognition of the driving expert's utterance (recognized in step 100-1), it takes control from the system by intervening immediately depending on the driving situation from the driver seat of the vehicle.

In step 100-9, the record of when driver intervention occurs is made simultaneously with the point in time of recognition of the driving expert's utterance (recognized in step 100-1). The point in time of the driving expert's utterance does not exactly coincide with the point in time when the driver intervention occurs.

In step 100-8, the point in time when the driver gives control to the vehicle again is recognized from the point at which the driver's intention to take control of the vehicle begins.

In step 100-7, information on the period of time before and after the point at which the control of the vehicle changes after the driver intervention is stored in a memory M-02. In this case, data from the point at which the driver's intention to take control of the vehicle begins to the point in time when the driver gives control to the vehicle again mentioned in step 100-8 is stored.

Step 100-6 performs control based on the guidance (command) for real-time vehicle control received in step 100-5 or the driver intervention (command) in step 100-7.

In step 100-11, the safety training guide of the driving expert is finally input, and the result of control to which the vehicle responds is stored, which is transmitted as learning data.

In step 200-1, sensing information is acquired by cameras, lidar, GPS, and so on.

Step 200-2 acquires data in real time from sensors installed in the autonomous vehicle (acquired in step 200-1) and recognizes driving environments in real time during training by the driving expert.

Step 200-5 receives driving environment recognition information and sensing information in real time, and stores records of every point in time of recognition of the driving environment and the point in time that the driving expert looks at external driving environments.

The point in time when it is stored refers to an interval of time, and reference information in relation to the situation regarding whether to meet the normal conditions for autonomous driving checked in step 300-4 is stored in a memory M-04 together with the driving environment recognition information and the sensing information.

Step 200-4 utilizes real-time vehicle commands (instructions and/or interventions) provided in step 100-6 as action commands based on the lower-level autonomous vehicle control. For example, by following the driving training instruction commands generated in step 100-5, control commands are issued by receiving commands such as "start", "stop", "slowly turn the steering wheel to the left", and "little faster". This is based on the information intervened in step 100-7 to distinguish whether it is a control command in manual or autonomous driving situations, and in the case of autonomous driving, it is classified into acting as trained and driving by the driving expert in an intervened state.

Step 200-3 uses the result of classification to integrate, store, and manage driving environment information recognized in real time (vehicles, lanes, road markings, pedestrians, etc.) and information controlled manually or automatically by driver commands (instructions and/or interventions) based on the specific point in time and period of time.

Step 300-5 uses the integrated, stored, and managed recognition/control data to receive information of determination on whether there are any abnormalities by having the driving expert check the driving status, situation, and training instructions of the autonomous vehicle. The determination is made based on the point in time of intervention through the speech commands received in step 100-1 and the operation of the steering wheel, brake, and accelerator pedals received in step 100-10, and the information of determination is transmitted to and stored in a memory M-03 and a memory M0-04.

As a process in which the driving expert rechecks commands via speech, whether the uttered content is converted and generated as intended by the driving expert is checked in steps 300-1 and 300-3.

In addition, a process of feedback is performed for whether the autonomous vehicle is being controlled as intended by the driver intervention.

FIG. 2 illustrates a method for managing driving behavior experience data recording based on driving expert feedback according to the embodiment of the present disclosure.

In step 200-7, the driver's intention is classified and stored based on instructions, rewards, status, and penalties when receiving driving training from the driving expert, and the criteria for determining points in time are illustrated.

The "continuous camera frames" refer to image frames T1 to T5 over time. Each point in time is defined based on the frame.

The "expert driver (speech)" refers to an utterance content of the driving expert, the "expert driver (intervention)" shows an intervention of the driving expert, the "memory (DB with labels)" shows a labeled data content based on the utterance content of the driving expert and the intervention of the driving expert, and the "situation (description)" refers to a record of detailed scene description of the driving situation.

In the situation of the first frame, the expert driver (speech) utters "slow down slowly and check a pedestrian is on the crosswalk or not", and the memory (DB with labels) checks whether information matches and stores recognition information and vehicle information.

In the situation of the second frame, the expert driver (speech) utters "no pedestrian", "keep slow and check the traffic signal", and "green light, go!". The expert driver (intervention) checks vehicle's recognition information and information on feedback, a point in time of recognition information and driving expert's intervention, and a point in time of end to store labeled data in the memory to check whether mutual (recognition between the autonomous vehicle and the driver) intention coincides with recognized information.

In the situation of the third frame, the expert driver (speech) utters "first, stop in front of the crosswalk (intervention)", "check again if driving is possible on the crosswalk", "no pedestrian", and "check if there is a vehicle coming from the left, is there any car?" The expert driver (intervention) checks driver intervention information, feedback provision, vehicle's recognition information, information on feedback, a point in time of recognition and driver's intervention, and a point in time of end to store labeled data in the memory to check whether mutual (recognition between the autonomous vehicle and the driver) intention coincides with recognized information.

In the situation of the fourth frame, the expert driver (speech) utters "good, keep the lane". The expert driver (intervention) stores labeled data in the memory to check a point in time for reward and driving instruction information.

In the situation of the fifth frame, the expert driver (speech) utters "keep the lane", "go to change the lane one to the left", "check the left lane and enter slowly", "turn the steering wheel smoothly to the left and now turn it back to the right to maintain it", and "good". The expert driver (intervention) stores labeled data in the memory to check whether a point in time of rewards when the vehicle is controlled by receiving commands, vehicle's recognition information and information on feedback, and recognition information coincide with each other.

Figure 3:
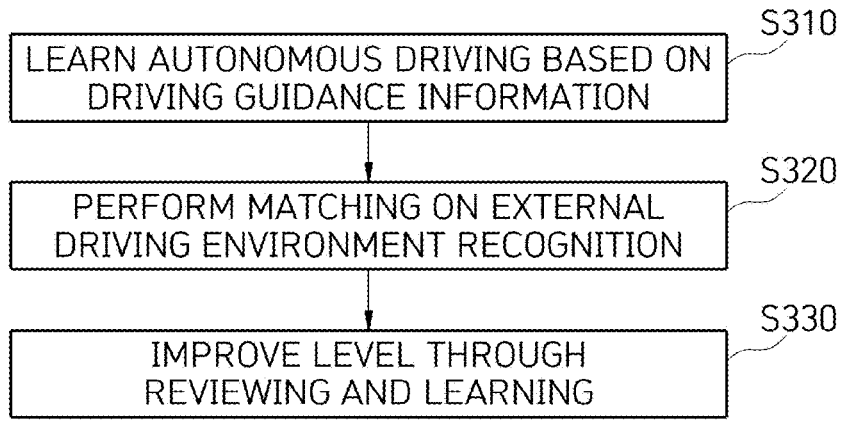
FIG. 3 illustrates a method for learning to drive growing autonomous vehicles in real time based on driver interaction according to the embodiment of the present disclosure.

FIG. 3 illustrates a method for learning to drive growing autonomous vehicles in real time based on driver interaction according to the embodiment of the present disclosure.

The method for learning to drive growing autonomous vehicles in real time based on driver interaction according to the embodiment of the present disclosure includes a step in which an autonomous vehicle performs autonomous driving learning based on driving guidance information generated using information received from a driving expert (S310), a step in which the autonomous vehicle performs external driving environment recognition matching on a result of recognition of a recognition system and a result of recognition of the driving expert (S320), and a step in which the autonomous vehicle performs reviewing and learning after driving training to improve a level of autonomous driving (S330).

Step S310 performs the autonomous driving learning using utterance information of the driving expert.

The utterance information includes an instruction for movement of the autonomous vehicle, a confirmation of surrounding recognition situations, a penalty related to intervention in case of issues that occur during driving, a reward for good work, and an additional explanation of situations to watch out for.

Step S310 classifies a result of converting the utterance information into text, performs matching with a list of predefined driving instruction data, and generates the driving guidance information.

Step S310 records information on situations where control of driving is taken through intervention of the driving expert in different driving situations.

Step S320 performs the matching using the result of recognition of the recognition system that recognizes driving environments in real time during the driving training and the result of recognition of the driving expert, which is a record stored for a point in time that the driving expert looks at external driving environments.

Step S330 receives information of determination on whether there is an abnormality from the driving expert in relation to driving status information of the autonomous vehicle and information on training instructions, receives a result of reconfirmation of commands by the driving expert, and performs the reviewing and the learning using the information of determination and the result of reconfirmation of commands.

Figure 4:
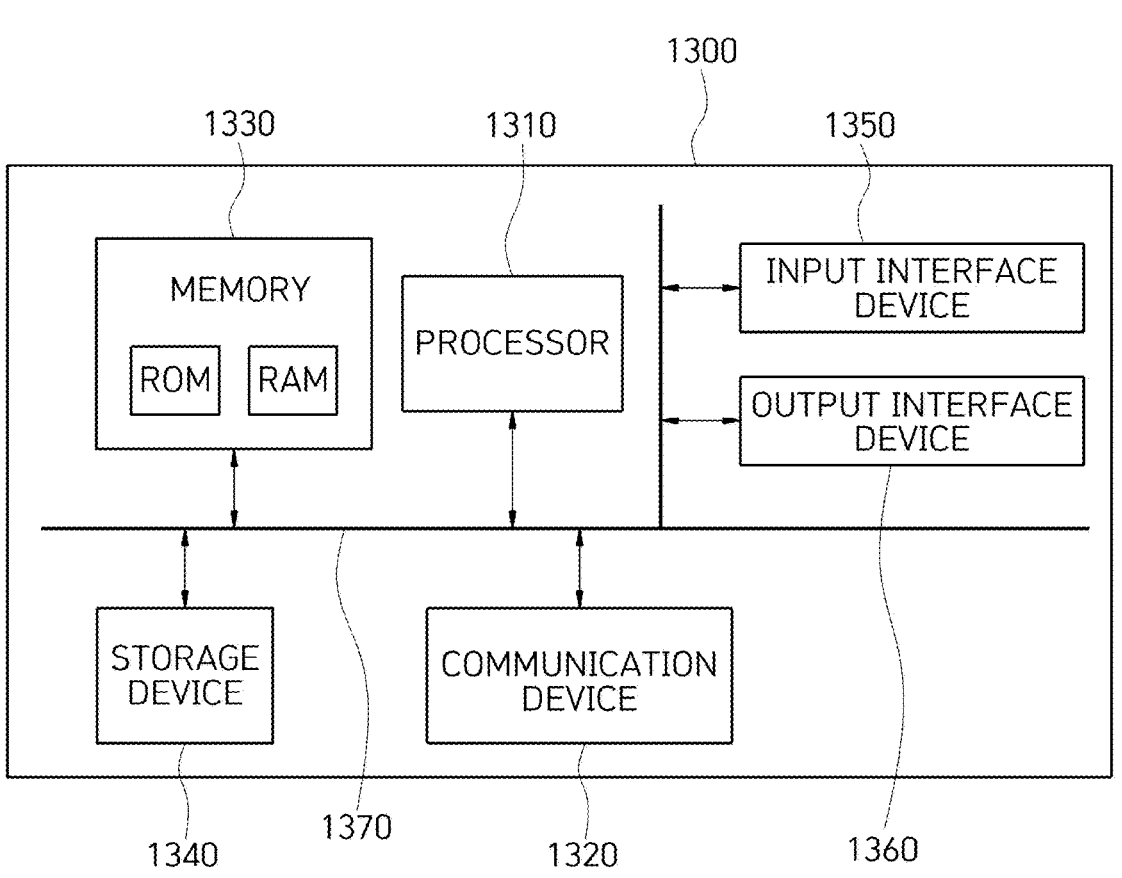
FIG. 4 is a block diagram illustrating a computer system for implementing the method according to the embodiment of the present disclosure.

FIG. 4 is a block diagram illustrating a computer system for implementing the method according to the embodiment of the present disclosure.

Referring to FIG. 4, the computer system, which is designated by reference numeral 1300, may include at least one of a processor 1310, a memory 1330, an input interface device 1350, an output interface device 1360, and a storage device 1340 that communicate with each other through a bus 1370. The computer system 1300 may also include a communication device 1320 coupled to a network. The processor 1310 may be a central processing unit (CPU) or a semiconductor device that executes commands stored in the memory 1330 or the storage device 1340. The memory 1330 and the storage device 1340 may include various types of volatile or non-volatile storage media. For example, the memory may include a read only memory (ROM) and a random access memory (RAM). In the embodiment of the present disclosure, the memory may be located inside or outside the processor, and the memory may be connected to the processor through various known means. The memory may include various types of volatile or non-volatile storage media. For example, the memory may include a read only memory (ROM) or a random access memory (RAM).

A system for learning to drive growing autonomous vehicles in real time based on driver interaction according to an embodiment of the present disclosure includes an input interface device 1350 configured to receive utterance information of a driving expert through a user interface, a memory 1330 configured to store a program for performing driving learning of an autonomous vehicle using the utterance information, and a processor 1310 configured to execute the program. The processor 1310 performs the driving learning based on driving guidance information generated using the utterance information, performs matching on a result of recognition of a recognition system and a result of recognition of the driving expert, and performs reviewing and learning after driving training to improve a level of autonomous driving.

The input interface device 1350 receives the utterance information that includes an instruction for movement of the autonomous vehicle, a confirmation of surrounding recognition situations, a penalty related to intervention in case of issues that occur during driving, a reward for good work, and an additional explanation of situations to watch out for.

The processor 1310 matches a result of converting the utterance information into text with a list of predefined driving instruction data, and generates the driving guidance information.

The processor 1310 records information on situations where control of driving is taken through intervention of the driving expert in different driving situations.

The processor 1310 performs the matching using the result of recognition of the recognition system that recognizes driving environments in real time during the driving training and the result of recognition of the driving expert, which is a record stored for a point in time that the driving expert looks at external driving environments.

The processor 1310 receives information of determination on whether there is an abnormality from the driving expert in relation to driving status information of the autonomous vehicle and information on training instructions, receives a result of reconfirmation of commands by the driving expert, and performs the reviewing and the learning using the information of determination and the result of reconfirmation of commands.

Accordingly, the embodiment of the present disclosure may be embodied by a computer-implemented method or by a non-transitory computer-readable medium storing computer-executable instructions. In an embodiment, computer readable instructions may perform, when executed by a processor, a method according to at least one aspect of the present disclosure.

The communication device 1320 may transmit or receive a wired signal or a wireless signal.

In addition, the method according to the embodiment of the present disclosure may be implemented in the form of program instructions that can be executed through various computer means and recorded on a computer-readable medium.

The computer-readable medium may include program instructions, data files, data structures, etc., alone or in combination. The program instructions recorded on the computer-readable medium may be specially designed and configured for embodiments of the present disclosure, or may be known and usable by those skilled in the art of computer software. The computer-readable recording medium may include a hardware device configured to store and perform program instructions. For example, the computer-readable recording media may be a magnetic medium such as hard disk, floppy disk, or magnetic tape, an optical medium such as CD-ROM or DVD, a magneto-optical medium such as floptical disk, ROM, RAM, flash memory, etc. The program instruction may include not only machine language code such as that created by a compiler, but also high-level language code that can be executed by a computer through an interpreter or the like.

According to the prior art, the autonomous driving is achieved by driving based on the pre-learned model or the set rule, or by applying pre-learned results through imitation learning and reinforcement learning for autonomous driving. On the other hand, according to the present disclosure, it is possible to continuously improve the level of autonomous driving by learning the autonomous vehicle in real time under the guidance of the driving expert in a training manner similar to the course and level that humans receive driving training, by performing matching on the understanding and focused matters of external driving environments by the recognition system and the driving expert to perform confirmation, and by having the vehicle perform reviewing and learning on its own after the driving training is completed.

According to the prior art, it is necessary to perform simulator-based generation and autonomous driving intelligence advancement for learning that is difficult to confirm in a real road environment. On the other hand, according to the present disclosure, it is possible to develop driving intelligence in real time in the vehicle.

According to the present disclosure, in the fields of autonomous driving as well as robotics and mobility, it is possible to transplant specific learned driving intelligence to enable basic driving and to gradually develop driving intelligence, thereby enabling expansion into the development of artificial intelligence.

The present disclosure is not limited to the above effects, and other effects of the present disclosure will be clearly understood by those skilled in the art from the above description.

US 12,643,568 B2

11 / 12

Although the specific embodiments have been described with reference to the drawings, the present disclosure is not limited thereto. It will be apparent to those skilled in the art that various changes and modifications may be made without departing from the spirit and scope of the disclosure as defined in the following claims.

What is claimed is:

1. A method for learning to drive growing autonomous vehicles in real time based on driver interaction performed by a system for learning to drive growing autonomous vehicles in real time based on driver interaction, the method comprising:

(a) an autonomous vehicle performing autonomous driving learning based on driving guidance information generated using information received from a human driving expert via an input interface device, the human driving expert being a human operator who provides guidance to the autonomous vehicle through voice instructions and manual driving intervention, wherein the autonomous driving learning comprises converting utterance information of the human driving expert into text, classifying the converted text, matching the classified text with a list of predefined driving instruction data, and generating the driving guidance information based on the matching;

(b) the autonomous vehicle performing external driving environment recognition matching on a result of recognition of a recognition system and a result of recognition of the human driving expert, wherein the result of recognition of the human driving expert is a record stored for a point in time at which the human driving expert looks at an external driving environment, and the external driving environment recognition matching is performed by temporally matching the result of recognition of the recognition system with the record stored for the point in time; and (c) the autonomous vehicle performing reviewing and learning after driving training to improve a level of autonomous driving, wherein information on a situation in which control of driving is taken through intervention of the human driving expert is recorded from a point at which an intention of the human driving expert to take control begins to a point at which control is returned to the autonomous vehicle, and the reviewing and learning are performed using the recorded information, information of determination on whether there is an abnormality from the human driving expert, and a result of reconfirmation of commands by the human driving expert.

2. The method according to claim 1, wherein the utterance information comprises an instruction for movement of the autonomous vehicle, a confirmation of surrounding recognition situations, a penalty related to intervention in case of issues that occur during driving, a reward for good work, and an additional explanation of situations to watch out for.

3. A system for learning to drive growing autonomous vehicles in real time based on driver interaction, comprising:

an input interface device configured to receive utterance information of a human driving expert, the human driving expert being a human operator who provides guidance to autonomous vehicle through voice instructions and manual driving intervention through a user interface;

a memory configured to store a program for performing driving learning of an autonomous vehicle using the utterance information; and a processor configured to execute the program, wherein the processor performs the driving learning based on driving guidance information generated using the utterance information, performs matching on a result of recognition of a recognition system and a result of recognition of the human driving expert, and performs reviewing and learning after driving training to improve a level of autonomous driving, wherein the processor converts the utterance information into text, classifies the converted text, matches the classified text with a list of predefined driving instruction data, and generates the driving guidance information based on the matching, wherein the result of recognition of the human driving expert is a record stored for a point in time at which the human driving expert looks at an external driving environment, and the processor performs the matching by temporally matching the result of recognition of the recognition system with the record stored for the point in time, and wherein the processor records information on a situation in which control of driving is taken through intervention of the human driving expert from a point at which an intention of the human driving expert to take control begins to a point at which control is returned to the autonomous vehicle, and performs the reviewing and learning using the recorded information, information of determination on whether there is an abnormality from the human driving expert, and a result of reconfirmation of commands by the human driving expert.

4. The system according to claim 3, wherein the input interface device receives the utterance information that comprises an instruction for movement of the autonomous vehicle, a confirmation of surrounding recognition situations, a penalty related to intervention in case of issues that occur during driving, a reward for good work, and an additional explanation of situations to watch out for.

* * * * *